United States Patent [19]

Halpern

[11] Patent Number: 4,695,601
[45] Date of Patent: Sep. 22, 1987

[54] POLYPHENYLENE ETHER THERMOPLASTIC PROTECTED FROM DISCOLORATION DURING PROCESSING

[75] Inventor: Yuval Halpern, Skokie, Ill.

[73] Assignee: Borg-Warner Chemicals, Inc., Parkersburg, W. Va.

[21] Appl. No.: 929,445

[22] Filed: Nov. 12, 1986

[51] Int. Cl.$^4$ ................................................. C08K 5/07
[52] U.S. Cl. .................................. 524/362; 524/361; 524/611
[58] Field of Search .............................. 524/361, 362

[56] References Cited

U.S. PATENT DOCUMENTS

| | | | |
|---|---|---|---|
| 3,392,146 | 7/1968 | Anderson et al. | 524/361 |
| 3,845,162 | 10/1974 | Hess et al. | 260/863 |
| 3,956,423 | 5/1976 | Katchman | 260/874 |
| 4,002,701 | 1/1977 | Katchman | 260/874 |
| 4,048,143 | 9/1977 | Hay et al. | 260/47 ET |
| 4,184,999 | 1/1980 | Olander | 260/42.18 |
| 4,255,321 | 3/1981 | Brussen | 260/45.75 |
| 4,309,335 | 1/1982 | Akutsu et al. | 260/45.7 |
| 4,405,739 | 9/1983 | Kinson | 524/117 |
| 4,427,814 | 1/1984 | Sugio et al. | 524/126 |
| 4,483,953 | 11/1984 | Axelrod | 524/119 |
| 4,588,764 | 5/1986 | Lee, Jr. | 524/128 |

FOREIGN PATENT DOCUMENTS 0176811  4/1986  European Pat. Off. .

OTHER PUBLICATIONS

Chander Prog. Poly. Sci., vol. 8, 469–484 (1982).

Primary Examiner—Lewis T. Jacobs
Attorney, Agent, or Firm—Emily A. Richeson

[57] ABSTRACT

A thermoplastic composition is provided which comprises a polyphenylene ether such as the copolymer of 2,6-dimethylphenol with 2,3,6-trimethylphenol, with an effective amount of an alpha-hydroxyketone such as benzoin to prevent discoloration on thermal processing.

14 Claims, No Drawings

POLYPHENYLENE ETHER THERMOPLASTIC PROTECTED FROM DISCOLORATION DURING PROCESSING

BACKGROUND OF THE INVENTION

The present invention relates generally to polyphenylene ether thermoplastics protected against discoloration during processing, and to methods for making said thermoplastic.

Discoloration is generally viewed as a detriment to the plastic, since it spoils the aesthetics, creates the appearance of non-uniformity, and is often associated by the customer with inferior properties, whether or not it is associated with actual degradation of the polymer. The art of compounding of plastics has led to a wide variety of stabilizers and discoloration preventatives which tend to differ from plastic to plastic.

In the foregoing and following discussions, the terms "preventing" or "prevention" or "preventative" is used in a relative sense rather than in an absolute sense, i.e. by prevention is meant suppression relative to an untreated control sample.

Vinyl polymers such as PVC are successfully prevented from yellowing by alkyltin compounds, barium-cadmium salts, and calcium-zinc salt mixtures. These types of stabilizers appear to prevent release of hydrogen chloride and prevent formation of long chains of conjugated double bonds which cause color. In polyolefins (which can degrade without a great deal of discoloration), the required stabilization is more directed to preventing loss of mechanical properties than to preventing discoloration; various phenols in combination with phosphites or organic sulfides are commonly used. In styrenic polymers such as ABS, it is also common practice to use tertiary-butylphenols plus phosphites; here again, much of the concern is protection against loss of mechanical properties, although prevention of discoloration is sometimes a consideration. In nylon 6,6, especially for fiber use, discoloration during thermal processing is a serious problem and discoloration preventatives such as phenylphosphinic acid are used. In polyester fiber and film, various phosphorus additives are used to prevent discoloration.

The development of the newer high-performance thermoplastics (the so-called "engineering thermoplastics") has imposed more stringent needs for improved means for preventing degradation, including that part of degradation which manifests itself as discoloration. The structures, mode of synthesis, and mode of degradation are different from the earlier plastics mentioned above. Most of these high-performance thermoplastics have heteroatoms (i.e. atoms other than carbon) in the backbone of the polymer, which makes their chemistry quite different from the chemistry of purely carbon-chain polymers. Moreover, the processing of these thermoplastics tends to be carried out at higher temperatures than the older lower-temperature thermoplastics. Discoloration is often a serious problem at the high temperatures used for mixing, molding, and extruding the engineering thermoplastics. The need is especially pressing for additives which can prevent discoloration in those engineering thermoplastics which are commonly processed above 450° F. and frequently at or above 570° F. Such thermoplastics include nylon 6, nylon 6,6, nylon 4,6, polyphenylene ether, polyamide-imides, polyarylates, polyarylene sulfones, aromatic polyesters, polyether-etherketones, polyether imides, polyether sulfones, polymethylpentene, polyphenylenesulfides, and blends thereof with each other and with other thermoplastics.

This requirement for prevention of discoloration during processing is unfortunately not satisfactorily met by polymer stabilizers which perform well in polymers processed at lower temperatures, such as polystyrene, polyethylene, polypropylene, ABS, diene elastomers, and the like. Some of the stabilizers described in the prior art for use in the engineering thermoplastics perform reasonably well in the lower end of the processing temperature range but decline badly in activity as the processing temperature reaches or exceeds 300° C. (about 570° F.). Moreover, while these stabilizers may have a beneficial effect in retarding loss of physical properties such as impact or tensile strength, they are often less effectual in preventing discoloration during thermal processing. Paradoxically, some stabilizers such as those containing aromatic amino structures can perform well as antioxidants while actually contributing to darkening of color.

This requirement for discoloration preventatives in the processing (hot mixing, molding, extrusion) of thermoplastics is also quite different from the requirement for stabilizers intended to protect the plastic during its service life, which for obvious reasons must be at temperatures lower than its processing temperature. Those stabilizers which are known for protection against atmospheric oxidation and photodegradation at the service temperatures of the plastic are generally found to be disappointing as high-temperature thermal processing stabilizers, and particularly disappointing in regard to prevention of discoloration during thermal processing. A further source of unpredictability lies in the structures of the polymers themselves. Different polymer structures have mechanistically different modes of discoloration, and the identity of the color-producing structures ("color bodies" or chromophores) is generally not known. From a knowledge of the "color bodies" in one kind of polymer, it is not possible to predict the factors affecting another kind of polymer.

A particularly little understood polymer class, in regard to thermal breakdown and discoloration, is the polyphenylene ethers and their blend compositions. It has been known since their discovery that these polymers discolor upon thermal processing. Up to now, this discoloration has had to be tolerated, or incompletely controlled, or masked to some degree by the use of a pigment, frequently titanium dioxide.

The patent literature shows many attempts to obtain high temperature processing stabilization of polyphenylene ethers by use of stabilizers known to be useful as processing stabilizers for other plastics (most frequently processed at lower temperatures) or by use of stabilizers known to be useful as long term stabilizers under service life conditions. In some instances, color improvement has been noted. Color improvement following the initial thermal processing of polyphenylene ethers and blend compositions thereof has been described using phosphites by Lee, U.S. Pat. No. 4,588,764 (May 13, 1986). Axelrod, U.S. Pat. No. 4,483,953 (Nov. 20, 1984), and Kinson, U.S. Pat. No. 4,405,739 (Sept. 20, 1983). Thermal degradation has also been associated by some investigators with the presence of oxidatively-liable phenolic end groups and consequently there have been a number of patents directed towards masking these groups by chemical reactions; for example, Hay et al., U.S. Pat. No. 4,048,143 (Sept. 13, 1977). Such end capping entails a separate process step, is prone to incompleteness, and has not satisfactorily solved the problem of discoloration. A survey of many additives evaluated in polyphenylene ethers, and of the several theories regarding the degradation mechanism of the polyphenylene ethers, is given by Chandra, Prog. Poly. Science, Volume 8, 469–484 (1982).

Dispite this history of attempts to achieve color stabilization in polyphenylene ethers and blend compositions thereof, satisfactory results have been elusive and the resins of this class on the market remain undesirably colored. It has been particularly difficult to achieve good color stability towards the high end of the temperature range in which the polyphenylene ether blends are processed, for instance above about 570° F. The manufacturer of a polyphenylene ether polymer must face the likelihood that some users will conduct their processing in this higher temperature range, and therefore it is desirable to have the polyphenylene ether formulated so that, as sold, it is capable of enduring these higher temperatures without discoloration.

It has not unexpectedly been found that compounds of the alpha-hydroxyketone class, which includes the benzoins, are discoloration preventatives for polyphenylene ethers and for blends containing polyphenylene ethers, since these alpha-hydroxyketones are themselves not exceptionally stable to heat; for example, benzoin was reported by Lachman, J. Am. Chem. Soc. 46, 717–718 (1924) to decompose at 300° C. (572° F.) to benzaldehyde and other products. It was also particularly surprising to find that at high temperatures, such as in the upper end of the processing range for polyphenylene ether blends, the lightness benefit given by the alpha-hydroxyketone is even greater than at temperatures in the lower end of the processing range.

It has been disclosed in European Patent Application No. 0176 811 (data laid open: 4/9/86) that certain benzoins are stabilizers for ABS, an acrylonitrile/styrene/butadiene graft copolymer. However, this European application indicates that the anti-discoloration action diminishes rapidly as the processing temperature is raised and becomes quite poor around 300° C. (572° F.), thus suggesting inapplicability to high-temperature-processed thermoplastics (see FIG. 1 in the cited application).

SUMMARY OF THE INVENTION

The present invention is a thermoplastic composition comprising a polyphenylene ether, and which further comprises, as an additive to suppress discoloration during thermal processing, an effective amount of an alpha-hydroxyketone, preferably having at least one hydrogen atom on the hydroxyl-bearing carbon atom of said ketone.

The present invention also makes available a method for the preparation of said compositions.

DETAILED DESCRIPTION OF THE INVENTION

The composition of the present invention comprises a polyphenylene oxide and an effective discoloration-preventing amount of an alpha-hydroxyketone, preferably having at least one hydrogen atom on the hydroxyl-bearing carbon atom of said ketone.

The polyphenylene ethers are polymers of one or more 2,6-dialkylphenols and/or 2,3,6-trialkylphenols; preferably, the polyphenylene ethers are polymers of 2,6-dimethylphenol and copolymers thereof with a 2,3,6-trialkylphenol such as 2,3,6-trimethylphenol, usually made by an oxidative process which is well known in the art and described, for instance, in U.S. Pat. No. 4,011,200. The most preferred copolymers are those comprising about 2 to about 20 weight percent of 2,3,6-trimethylphenol and 98 to 80 percent 2,6-dimethylphenol.

It is even more preferred that the compositions of the invention comprise blends of the preferred polyphenylene ethers with a styrenic resin, said blends containing 5 to 95% of the polyphenylene ether and 95 to 5% of the styrenic resin. The styrenic resin useful in such blends include the homopolymers of styrene, vinyltoluene, chlorostyrene, bromostyrene, and the like as well as copolymers thereof, and preferably high impact (HIPS) versions thereof, which commonly include graft copolymers of said monomers on rubbery substrates and blends of said homopolymers or copolymers with rubbery impact modifiers. A great variety of such styrenic resins are readily available commercially or may be made by means known in the art.

Such blends of polyphenylene ether homopolymer or copolymer resins with styrenic resins are widely available commercially, and include the NORYL ® resins sold commercially by General Electric Company and the PREVEX ® resins sold by Borg-Warner Chemicals, Inc. As sold, these commercial blends are formulated with plasticizers, pigments, flame retardants, stabilizers, the like. PREVEX ® resin is a blend of the 2,6-dimethylphenol and 2,3,6-trimethylphenol oxidative copolymer with a high impact polystrene. Typical injection molding temperatures for polyphenylene ether blends range from 450° to 620° F., as shown by the tabulation in Plastics Technology, Manufacturing Handbood and Buyers Guide, Bill Communications, NY, NY (1986), pp. 399–400.

The discoloration preventative to be used in the compositions and method of the invention is an alphahydroxyketone, preferably with at least one hydrogen atom on the hydroxylated carbon atom. The compounds suitable for use in the invention may be represented by the structure of $CRR''(OH)C(O)R'$ where $R, R'$, and $R''$ are independently selected from the group of hydrocarbyl radicals and where R and R'' can also be hydrogen, R'' preferably being hydrogen. Since the function of the compounds depend on the critical group $-C(OH)C(O)-$, wide variations of R and R' are permissable and these radicals, if hydrocarbyl, can be of many types, as as alkyl, alkenyl, cycloalkyl, cycloalkenyl, haloalkyl, aryl, substituted aryl, and heterocyclic aliphatic or aromatic radicals. Examples of such ketones include butyroin, 5-hydroxyoctan-4-one, 9-hydroxyhexadecan-8-one, 1,4-diphenyl-3-hydroxybutan-2-one, 1,4-dicyclohexyl-3-hydroxybutan-2-one, 1,4-bis(4methoxyphenyl)-3-hydroxybutan-2-one, 1,4-di-2-pyridy-13-hydroxybutan-2-one, omega-hydroxy-2,4,5-trichloroacetophenone, 1,4-dichloro-3-hydroxybutan-2-one, 1,2-bis(2oxacyclohex-3-enyl)-2-hydroxyethan-1-one, 4-hydroxyhexa-1,5 diene-3-one, 1,4-dicyclohexen-4-yl-3-hydroxybutan-2-one, and, in the less preferred category where R'' does not equal hydrogen, alpha-phenylbenzoin. Non-interfering substituents may be present, i.e. substituents which do not cause instability or incompatibility with the resin. Such substituents will be readily evident to those skilled in the art. Examples of permissable substituents are: hydrocarbyl, hydrocarbyloxy, halogen, hydrocarbylthio, and carbalkoxycarbonyl. An example of interfering substituent would be a second hydroxy; for instance dihydroxyacetone is incompatible and insufficiently stable. These skilled in the art would recognize that other interfering groups would be those that react with the ketone or hydroxy functional groups or those which are thermally unstable such as hydrazo. The two groups R and R' can be conjoined to form a ring, as in 2-hydroxycyclohexanone, or can be members of a polymer chain such as the linear acyloin condensation product of a long chain dialdehyde such as the acyloin polymer from terephthalic dialdehyde or isophthalic dialdehyde.

Preferred R, R', and R" groups are alkyl of from 2 to 20 carbon atoms, phenyl, methoxyphenyl, or halophenyl. Where R and R' are the same group and R" is hydrogen, such compounds are readily made in one step from available aldehydes by the well-known acyloin condensation reaction. Especially preferred because of its ready availability and good performance is benzoin, in which R and R' are both phenyl. The two groups R and R' need not be identical; for instance hydroxypropiophenone (R=methyl, R'=phenyl) is an effective compound for use in the invention.

It is also preferred that the alpha-hydroxyketone be one which is substantially colorless, so as not to obscure the color benefit intended from its use. An example of an undesirably colored ketone is pivaloin, which is orange and of marginal utility therefore. Other examples will be obvious to one skilled in the art, for example alpha-hydroxyketones with known chromophoric groups such as azo groups would be undesirable for the reason given. The term "substantially colorless" is intended to allow for a pale color which will be considered unobjectionable at the use dilution in the resin.

An effective amount of the discoloration preventing additive to be used in the compositions and method of the invention is that which gives the desired color benefit in the given resin, and is preferably in the range of 0.05 to 5% by weight. Lesser amounts may not produce enough color benefit; greater amounts may be wasteful and may exude, produce odor, or plasticize excessively. As will be recognized by those skilled in the art of plastics compounding, the best amount to be used in any given case will be determined readily, amounts near the low end of the stated range being used where color standards are lenient, processing conditions relatively mild, or the resin relatively insensitive to discoloration, whereas amounts near the high end of the stated range would be used where color requirements are demanding, processing conditions relatively stringent (exceptionally high temperatures and/or long time), and the resin relaively sensitive to discoloration.

The compositions of the invention also encompass blends of these high temperature processed polymers with each other and with other polymers such as vinyl copolymers, styrene polymers and copolymers, and polyesters. Although the greater advantage of the discoloration preventing additive of the invention is at the higher temperatures, it will be understood that it is also useful at lower processing temperatures of blends containing low percentages of the normally high-temperature processed engineering thermoplastic and high percentages of the low-temperature thermoplastic.

Likewise other processing ingredients may be included, as will be evident to those skilled in the art of polymer compound. Such ingredients include stabilizers against oxidation and photodecomposition under service temperatures; processing aids, flow improvers, mold release agents; antistatic agents; colorants; odorants; electrical conductivity modifiers; fillers; reinforcing agents; impact modifiers; fire retardants; and plasticizers.

In the method aspect of the invention, the thermoplastic resin and the discoloration-preventing additive are mixed by any of a variety of techniques, such as mixing in a Banbury mixer, dry blending, melt blending, extrusion, or milling.

In the preferred method of the invention, the discoloration of the thermoplastic during thermal processing at high temperature, such as above 450° F. and more specifically above 570° F. is best accomplished by admixing the discoloration-preventing addtive of the invention in an effective amount before much thermal discoloration has occurred. This admixing may be accomplished using any of the mixing methods named above. For instance, the mixing of the color preventive can be done near the low end of the acceptable processing temperature range, or very quickly if at the high end of this range. However, even if some discoloration has already occurred, admixing the additive of the invention can lighten it somewhat or at least prevent further darkening.

The practice of the invention will be better understood by consideration of the following examples, which are offered by way of illustration and are not intended to be limiting.

SPECIFIC EMBODIMENTS

The term "lightness" as used herein refers to the attribute of color perception by which an object is judged to reflect more or less light than another object.

The lightness measurements given in the following examples were carried out by molding flat plates of the polymer and evaluating their lightness using a Labscan 2 Spectrocolorimeter (manufactured by the Hunter Associates Laboratory, Inc.). The reflectance in the visual wave length range is measured and expressed on a scale from 0 to 100, where 0 is total blackness (no reflectance) and 100 is equal to the standard for total whiteness. All of the data in the examples below make use of color ratings in units on this scale. The larger the number, the lighter the plastic. The method and principles are discussed by Billmeyer and Saltzman in "Principles of Color Technology," Wiley-Interscience, New York, NY (1966), chapters 1 and 2.

EXAMPLE 1

A mixture of 100 parts by weight of PEC (the copolymer of 2,6-dimethylphenol and 2,3,6-trimethylphenol) and 0.5 parts of benzoin were blended in a twin-screw extruder, the initial zone in the extruder being at 250° C., the next zone at 280° C., and the last two zones at 310° C. The blend was then injection molded using a Battenfeld injection molding machine at 600° F. to prepare a test sample. The lightness rating of the sample was 57. A comparison sample without the benzoin, similarly blended and molded, had a lightness of 41.

Thus, it may be seen that the discoloration-preventing action of an alpha-hydroxyketone is demonstrable on the polyphenylene ether as the sole resin component of the mixture.

EXAMPLE 2

The ingredients enumerated below were compounded on a twin screw extruder. Injection molding was conducted with a Battenfeld injection molding machine to make samples suitable for the lightness measurements.

A blend of 93 parts PEC (as defined in Example 1), 7 parts EPM (ethylene propylene copolymer), and 6 parts TPPA (triphenylphosphate, a flame retardant) which was injection molded at 550° F. showed a lightness of 66. The same blend also containing 1 part of benzoin showed a lightness of 73.

Thus it may be seen that the polyphenylene ether blends of the invention may exhibit improved color following processing relative to polyphenylene ether blends not containing an alpha-hydroxyketone.

EXAMPLE 3

A similar experiment was run to show the effect of various other alpha-hydroxyketones consistent with the invention, in comparison to benzoin. The resin consisted of unpigmented PREVEX ® and was molded at 500° F. The lightness results were as follows:

| | |
|---|---|
| No hydroxyketone | 59 |
| Benzoin | 73 |
| Alpha-Pyridoin | 63 |
| Anisoin | 74 |
| 4,4'-Dichlorobenzoin | 73 |

These results afforded data on the performance of a range of the discoloration-preventing additives of the invention in a polyphenylene ether blend.

EXAMPLE 4

An experiment similar to that of Example 3 was conducted but using a molding temperature of 600° F. The lightness results were as follows:

| | |
|---|---|
| No hydroxyketone | 52 |
| Benzoin | 71 |
| Alpha-Pyridoin | 55 |
| Anisoin | 70 |
| 4,4'-Dichlorobenzoin | 70 |

These results afforded data regarding the efficacy of a number of the discoloration-preventing additives in compositions of the invention. Comparison of these data to those of the preceding example also shows the relative efficacy of such compositions of 600° F. relative to 500° F. as in the previous example.

EXAMPLE 5

An experiment similar to Example 3 was conducted but at a molding temperature of 500° F., with benzoin alone at 0.5 parts and with a typical antioxidant-type stabilizer, butylated hydroxytoluene (BHT) at 0.6 parts and octyl diphenyl phosphite (ODDP) at 0.4 parts, and also with a combination of benzoin (0.5 parts) with the antioxidant-type stabilizer. The lightness results were as follows:

| | |
|---|---|
| No additive | 59 |
| BHT/ODPP | 67 |
| BHT/ODPP/benzoin | 73 |
| Benzoin | 73 |

This example afforded a comparison of a composition of the invention to a composition containing a typical stabilizer.

EXAMPLE 6

The experiment in Example 5 was repeated but at a molding temperature of 600° F. The lightness results were as follows:

| | |
|---|---|
| No additives | 52 |
| BHT/ODPP | 58 |
| BHT/ODPP/benzoin | 71 |
| Benzoin | 71 |

Thus, from a comparison of this example to Example 5, it may be seen that the polyphenylene ether blends of the invention may exhibit more color improvement, relative to polyphenylene ether blends containing a known stabilizer, at higher processing temperatures.

EXAMPLE 7

The experiment in Example 6 was repeated but with the resin pigmented with titanium dioxide (4 pph). The lightness results were as follows:

| | |
|---|---|
| No additive | 86 |
| BHT/ODPP | 88 |
| BHT/ODPP/benzoin | 91 |
| Benzoin | 90 |

This example presented a comparison of a composition of the invention to a composition containing a typical stabilizer.

EXAMPLE 8

A further comparison of various alpha-hydroxyketones was conducted in unpigmented PREVEX ® injection molded at 500° F. The lightness results were as follows:

| | |
|---|---|
| No additive | 60.4 |
| Benzoin | 72.7 |
| Butyroin | 68.7 |
| 2-Hydroxypropiophenone | 71.9 |
| Pivaloin | 60.5 |

These results afforded data on the efficacy of a range of the color-preventing additives in compositions of the invention.

EXAMPLE 9

A further comparison of various alpha-hydroxyketones was conducted in unpigmented PREVEX ® injection molded at 600° F. The lightness with the various additives was as follows:

| | |
|---|---|
| No additive | 56 |
| Benzoin | 70 |
| Butyroin | 67 |
| 2-Hydroxypropiophenone | 68 |

These results afford data on the performance of a range of the ketone additives in compositions of the invention; the performance of benzoin at 600° F. may be compared to the performance of benzoin at 500° F.

EXAMPLE 10

The effect of benzoin as a discoloration-preventing additive was tested in formulations of unpigmented PREVEX ® containing various flame retardant additives, all at 4 pph. The injection molding was conducted at 500° F. The results were as follows:

In a composition containing PYROCHECK 68PB ®, a polybrominated polystyrene made by Ferro Corporation, the lightness was 72 with 0.5 parts of benzoin and 65 without benzoin.

In a composition containing PO64P, an oligomeric 2,6-dibromophenylene ether made by Great Lakes Chemicals Company, the lightness was 69 with 0.5 parts of benzoin and 60 without benzoin.

In a composition containing DE-83, a decabromodiphenyl ether made by Great Lakes Chemical Company, the lightness rating was 67 with 0.5 parts of benzoin and 60 without benzoin.

These results afforded data on the performance of benzoin in polyphenylene ether blends containing typical flame retardants.

In addition to these results with polyphenylene ethers, the discoloration preventing additives of this invention were also found to prevent color development in thermal processing of certain other high-temperature-processed thermoplastics; 0.5 pph of benzoin suppressed discoloration of nylon 6,6 at 575° F., of a polyether imide (General Electric ULTEM) at 650° F., of a polysulfone (Union Carbide UDEL) at 650° F. of polystrene at 400° F., and of polyethylene at 350° F. In the cases of nylon 6,6 and polyethylene, although lightness was improved, a yellow shade was imparted.

Thus alpha-hydroxyketones may also be useful to suppress discoloration of other engineering thermoplastics, such as polyamides, polysulfones, polycarbonates, aromatic polyamideimides, high temperature polyesters and polyarylates, especially when processed above 570° F.

These examples are intended to be illustrative but are not intended to be limiting. The invention is defined by the following claims.

We claim:

1. A thermoplastic composition comprising a polyphenylene ether and an alpha-hydroxyketone, said ketone being present in an amount sufficient to suppress discoloration of the composition during processing.

2. A thermoplastic composition comprising a polyphenylene ether and an alpha-hydroxyketone having at least one hydrogen atom on the carbon bearing the hydroxyl group, said ketone being present in an amount sufficient to suppress discoloration of the composition during processing.

3. The composition of claim 2 wherein the ketone is substantially colorless.

4. The composition of claim 2 where the ketone is benzoin.

5. The composition of claim 2 where the ketone is anisoin.

6. The composition of claim 2 where the ketone is 4,4'-dichlorobenzoin.

7. The composition of claim 2 where the polyphenylene ether comprises a polymer of 2,6-dimethylphenol.

8. The composition of claim 2 where the polyphenylene ether comprises a copolymer of 2,6-dimethylphenol and 2,3,6-trimethylphenol.

9. The composition of claim 2 where the polyphenylene ether is blended with a high impact polystyrene.

10. The composition of claim 2 where the polyphenylene ether is blended with an ethylene propylene copolymer.

11. A thermoplastic composition comprising a copolymer of 2,6-dimethylphenol and 2,3,6-trimethylphenol blended with a high impact polystyrene and containing from 0.05 to 5% by weight of benzoin.

12. A method for the prevention of discoloration of a thermoplastic comprising a polyphenylene ether said method comprising mixing into said thermoplastic an effective amount of an alpha-hydroxyketone having at least one hydrogen atom on the hydroxyl-bearing carbon atom of said ketone.

13. A method for the prevention of discoloration of an engineering thermoplastic during processing above 570° F. said method comprising mixing into said thermoplastic an effective amount of an alpha-hydroxyketone having at least one hydrogen atom on the hydroxyl-bearing carbon atom of said ketone.

14. The method of claim 12 where the ketone is benzoin.

* * * * *